United States Patent [19]

Reichner

[11] Patent Number: 4,876,163
[45] Date of Patent: Oct. 24, 1989

[54] GENERATOR CONFIGURATION FOR SOLID OXIDE FUEL CELLS

[75] Inventor: Philip Reichner, Plum Boro, Pa.

[73] Assignee: Westinghouse Electric Corp., Pittsburgh, Pa.

[21] Appl. No.: 135,190

[22] Filed: Dec. 18, 1987

[51] Int. Cl.$^4$ .............................................. H01M 8/10
[52] U.S. Cl. ........................................ 429/30; 429/31; 429/32; 429/26
[58] Field of Search .................................. 429/30-32, 429/26

[56] References Cited

U.S. PATENT DOCUMENTS

| | | | |
|---|---|---|---|
| 3,402,230 | 9/1968 | White | 429/31 X |
| 4,490,444 | 12/1984 | Isenberg | 429/31 |
| 4,562,124 | 12/1985 | Ruka | 429/30 |
| 4,640,875 | 2/1987 | Makiel | 429/30 |
| 4,664,987 | 5/1987 | Isenberg | 429/31 |

OTHER PUBLICATIONS

1985 *Fuel Cell Seminar*, HSU "Zirconia Fuel-Cell Power System", p. 115, 5/85.
1986 *Fuel Cell Seminar*, HSU, "Zirconia Fuel-Cell Power System Planar Stack Development", p. 84, 10/86.

*Primary Examiner*—Stephen J. Kalafut
*Attorney, Agent, or Firm*—Joyce L. Morrison; Richard D. Fuerle

[57] ABSTRACT

Disclosed are improvements in a solid oxide fuel cell generator 1 having a multiplicity of electrically connected solid oxide fuel cells 2, where a fuel gas is passed over one side of said cells and an oxygen-containing gas is passed over the other side of said cells resulting in the generation of heat and electricity. The improvements comprise arranging the cells in the configuration of a circle, a spiral, or folded rows within a cylindrical generator, and modifying the flow rate, oxygen concentration, and/or temperature of the oxygen-containing gases that flow to those cells that are at the periphery of the generator relative to those cells that are at the center of the generator. In these ways, a more uniform temperature is obtained throughout the generator.

28 Claims, 6 Drawing Sheets

GENERATOR CONFIGURATION FOR SOLID OXIDE FUEL CELLS

The Government of the United States of America has rights in this invention pursuant to Contract No. DE-AC-0280ET-17089 awarded by the U.S. Department of Energy.

TECHNICAL FIELD

The invention relates to generator configurations for solid oxide fuel cells.

BACKGROUND OF THE INVENTION

In a conventionally designed solid oxide fuel cell generator, a multiplicity of solid oxide fuel cells are arranged in a square or rectangular configuration with the rows connected in series and the columns connected in parallel as taught by Isenberg in U.S. Pat. Nos. 4,395,468 and 4,490,444. While this arrangement works quite well in most respects, it results in a large temperature gradient between the hotter cells at the center of the generator and the cooler cells at the periphery, especially those at the corners. This large difference in temperature makes it difficult to maintain the temperature of all the cells in the generator within the narrow operating range of about 800° to about 1100° C. Higher temperatures at the center of the generator may result in reduced life and material failures, and lower temperatures at the periphery increase the electrical resistance of the cells and reduce their efficiency. Obvious solutions to this problem, such as increasing the insulation around the generator, have proved to be impractical due to increased cost and size.

It is an object of this invention to reduce the temperature gradient between cells in a solid oxide fuel cell generator.

DISCLOSURE OF THE INVENTION

I have discovered that the flow of heat from the inside of the generator outward to the periphery can be greatly reduced if the cells in the generator are arranged in a circular or spiral fashion. In this way, the temperature gradient between the center of the generator and the cells at the periphery is reduced, and it is easier to operate the generator within the optimal temperature range.

Since each cell in the generator produces electricity at a relatively low voltage, and low direct current voltages cannot be efficiently transformed to high voltages, it is important that the cells in a generator be capable of being arranged in series so that the voltage of each cell is additive. One advantage of the circular or spiral cell configuration of this invention is that all of the cells can be easily arranged in series, resulting in a higher voltage output.

This configuration might be expected to perform less efficiently if, due to the curvature of the connected cells, the electrical connections made to those cells were not on opposite sides of the cells. That would result in the current density on one side of the cell being lower than the current density on the other side of the cell, which would reduce the net electrical power generated by that cell. However, I have been able to overcome this problem through the use of a unique interconnection that, although it is attached to opposite sides of the cells, nevertheless permits changes in the direction in which the cells are aligned.

In another embodiment of this invention, the cells are arranged in series in a folding pattern within a cylindrically-shaped generator, thereby eliminating corners in the generator and achieving a more uniform temperature distribution between the cells.

I have also found that the uniformity of the temperatures of the cells can be further enhanced by increasing the flow rate, oxygen concentration, and/or temperature of the oxygen-containing gas that is sent to cells at the periphery of the generator over that sent to cells at the center of the generator.

DESCRIPTION OF THE PREFERRED EMBODIMENTS

Figure 1:
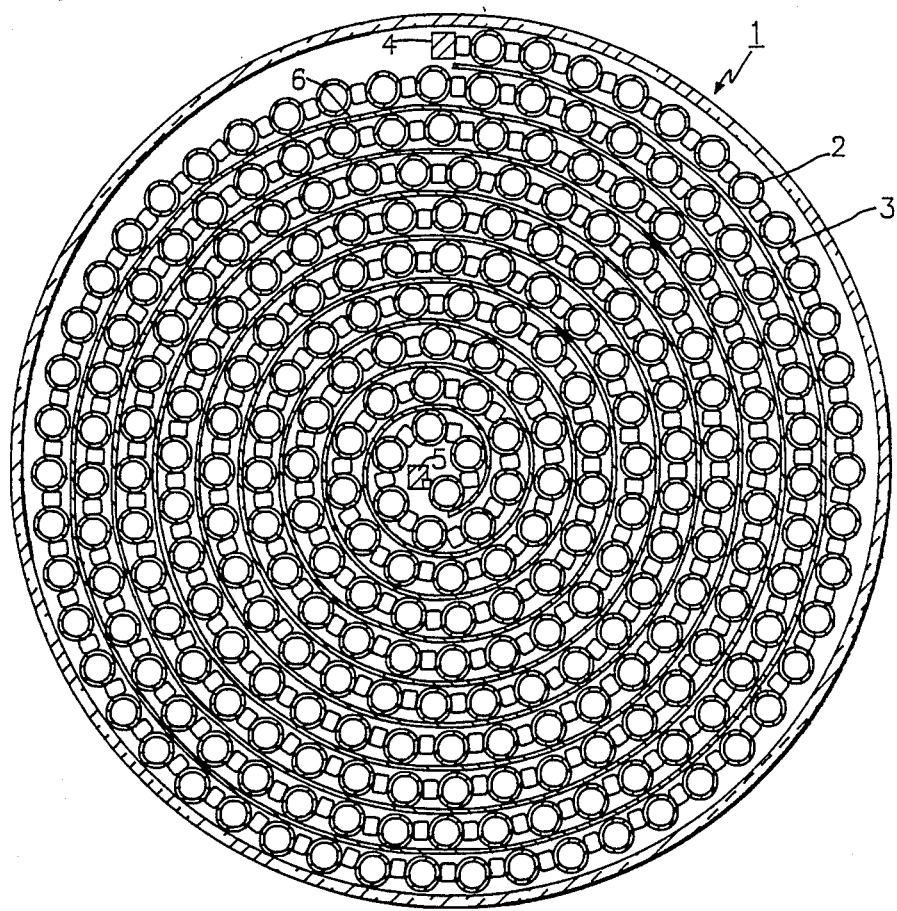
FIG. 1 is a plan view in section showing a certain presently-preferred embodiment of a solid oxide fuel cell generator according to this invention having a spiral arrangement of fuel cells.
Figure 1A:
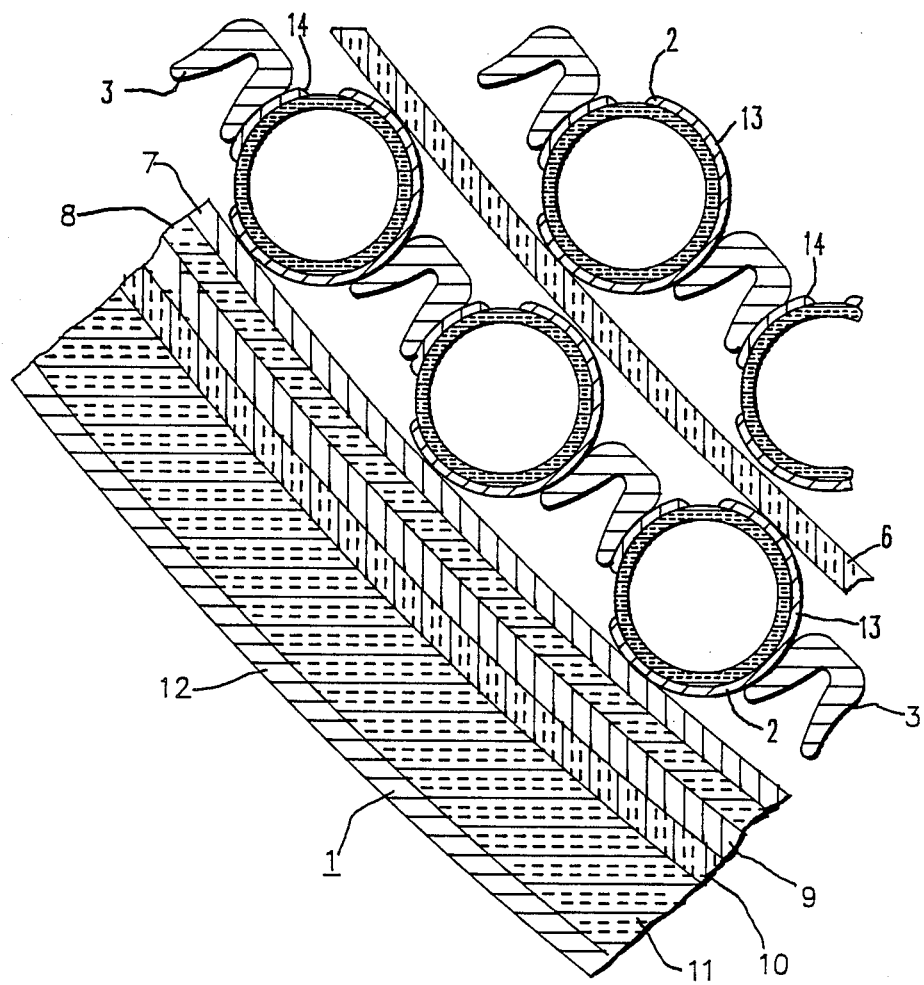
FIG. 1A is an enlargement of several fuel cells in FIG. 1, and shows the detailed structure of the interconnection between the fuel cells.

In FIGS. 1 and 1A, a solid oxide fuel cell generator 1 comprises a multiplicity of tubular solid oxide fuel cells 2 connected in series by interconnections 3, in the configuration of a spiral. (Details of the construction of each individual cell can be found, for example, in U.S. Pat. No. 4,490,444, herein incorporated by reference, as well as in many other publications.) Power leads 4 and 5 connect to opposite ends of the series connected cells. An insulating divider sheet 6, typically made of $\frac{1}{8}$ inch alumina fiber cloth or paper, separates the turns of the spirally-arranged cells. Around the outside of the cell stack are several alumina fiber insulation layers, a board insulation 7, typically of 0.12 to 1.00 inch thickness, and a fiber blanket 8, typically of 0.4 inch alumina. Typically, a fuel gas such as hydrogen, carbon monoxide, methane, or mixtures of these, will be introduced to the spaces between and surrounding the cells, and an oxidant such as air will be passed through the bore of each cell or introduced into each bore through feed tubes. A metal canister 9 prevents hydrogen from passing into the outer layers of insulation and entering the pores of that insulation, which would increase its thermal conductivity. The outer layers of insulation consist of another fiber blanket 10, typically of 0.4 inch alumina, and additional insulation boards or blankets 11, typically of 5 inch radial thickness, of alumina. The entire structure is enclosed and supported by a stainless steel housing 12.

FIG. 1A shows that although the cells are arranged in a spiral or circular fashion, the electrical connections to each cell are on directly opposite sides of the cell. That is, the connections are 180° apart so that the portions of the cell in between the two connections are equal, and therefore the current densities on those two portions are also equal. Electrical connections to opposite sides of circularly or spirally arranged cells is made possible by using U-shaped interconnection 3. This interconnection runs the length of the cell with the open portion of the U facing outward. While other types of interconnections, such as a tubular interconnection, can also be used, the U-shaped interconnection is particularly suitable when the cells are arranged in a circular or spiral configuration. Each U-shaped interconnection 3 attaches to the fuel electrode 13 of one cell and is electrically connected by means of strip 14 to the air electrode of the adjacent cell. The material of the strip 14 is electronically conductive and chemically stable both in the reducing fuel and in the oxidant. The strip 14 contacts the cathode 41, shown in FIG. 1A as the inner tubular component through which oxidant is passed, along the full axial length of the cell. The axially-extended anode or fuel electrode 13 is separated from the tubular cathode by a thin film of solid electrolyte. The thin electrolyte film, which is not shown in FIG. 1A, extends circumferentially beyond the anode/cathode interface and overlaps the edges of the strip 14 to form a gas-tight seal between the oxidant and the fuel. The interconnection is typically made of a flexible metal felt, such as nickel felt, to allow for expansion and contraction relative to the cells.

Figure 2:
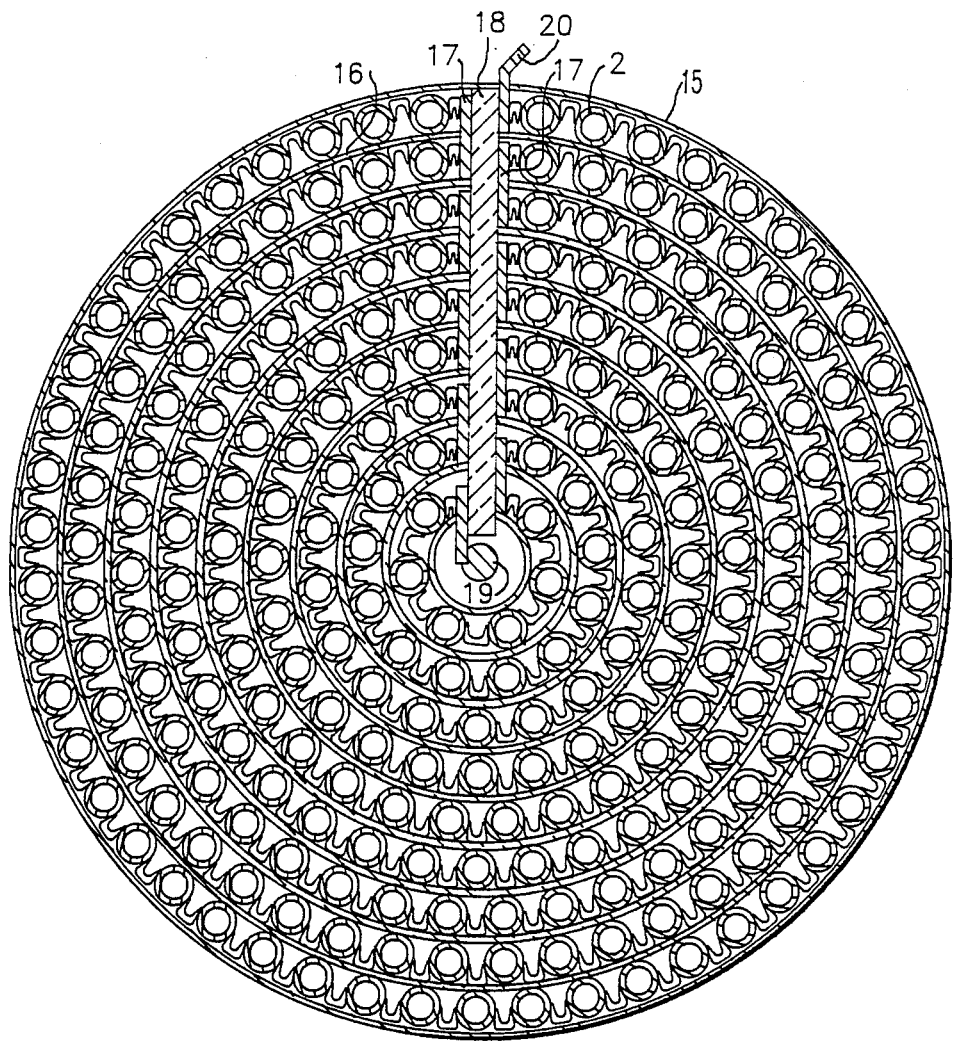
FIG. 2 is a plan view in section showing an alternative presently-preferred embodiment of a solid oxide fuel cell generator configuration according to this invention, where the cells are arranged in concentric circles.

In FIG. 2, the cells 2 are arranged as concentric circles separated by the insulating dividers 16. Row interconnectors 17, separated by insulating divider 18, connect the cells in one circle in series to the cells in an adjacent circle. Power leads 19 and 20 draw current from the generator.

Figure 3:
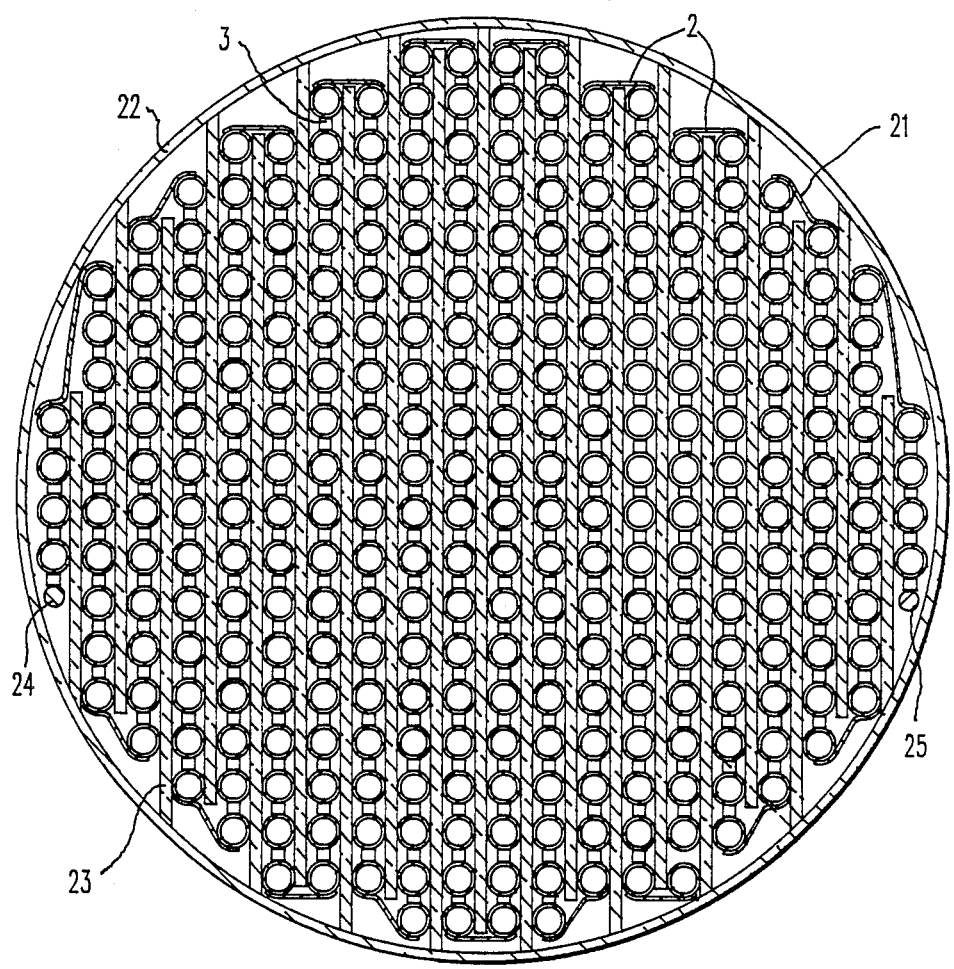
FIG. 3 is a plan view in section showing another alternative presently-preferred configuration of a solid oxide fuel cell generator according to this invention, where the fuel cells are in a folded arrangement within a circular periphery.

In FIG. 3, rows of fuel cells 2 are connected in series by interconnections 3, and each row is connected in series to the next row by interconnections 21. The rows are arranged within a circularly-shaped periphery 22, and each row is separated from the next by insulating divider plates 23. Power leads 24 and 25 draw current from the generator. The insulation surrounding periphery 22 (not shown) can be similar to the insulation shown for the configuration of FIG. 1.

The embodiment of FIG. 1 is preferred to that of FIG. 2 because it is easier to construct and mass produce. That is, the cells are laid out on the divider, connected together by means of the interconnections, and are then rolled up to form the spiral arrangement. In FIG. 1, if it is desirable to arrange some of the cells in parallel, this can be accomplished by rolling up two or more rows of series connected cells simultaneously. Parallel connections can also be made in the embodiments of FIGS. 2 and 3. Where parallel connections are made, the number of series connected cells in each parallel string is preferably identical so that the voltages in each string are the same.

Figure 4:
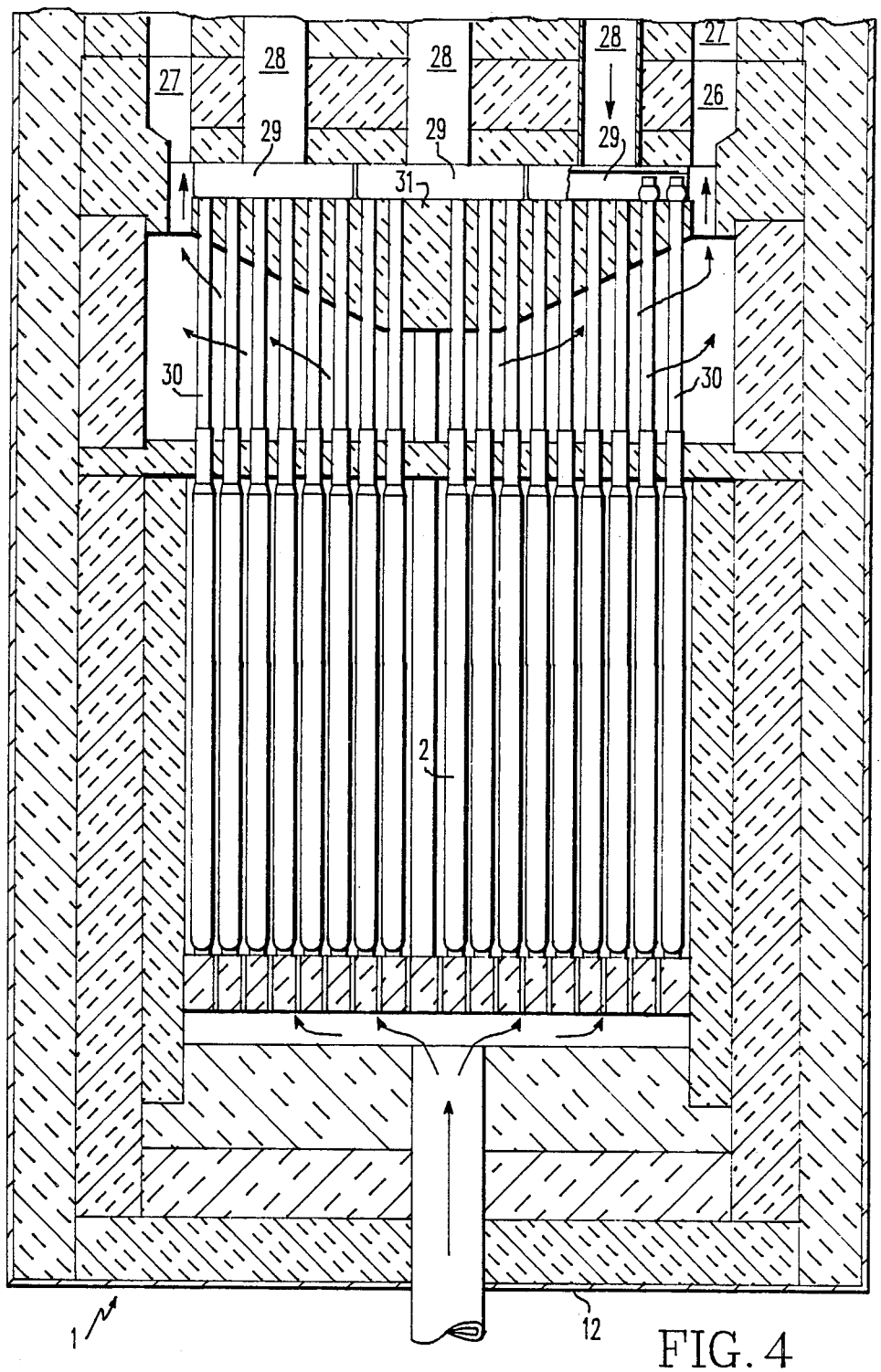
FIG. 4 is a side view in section of the fuel cell generator of FIG. 1, and illustrates the increased exhaust gas flow over the reactant gas feed tubes for those cells that are at the periphery of the generator.

FIG. 4 is a side view of a generator, similar to the generator shown in FIG. 1. In FIG. 4, a fuel gas enters the generator from the bottom and reacts with oxygen from the cells as it passes over the outside of cells 2, generating heat and electricity. The spent fuel passes through holes (not shown) in a cell positioning board, into heat exchange manifold 26, where residual fuel is combusted, and the exhaust gas then exits the generator through passage 27. Air (or other oxygen-containing gas) enters the generator through passages 28, which lead to a number of air manifolds 29. The air is distributed to the inside of feed tubes 30 which carry it to the bottom inside of fuel cells 2. The air then passes along the annulus between the feed tube and cell bore and exits into the heat exchange manifold at the top of the cell, where it consumes the residual fuel. Insulation material 31 is shaped so that a greater length of the tubes 30 that lie near the periphery of the generator are exposed to the exhaust gases than the length of the tubes 30 that lie near the center of the generator. As a result, the air in the tubes 30 that lie near the periphery is heated to a higher temperature than the air in the tubes 30 that lie near the center.

Figure 4A:
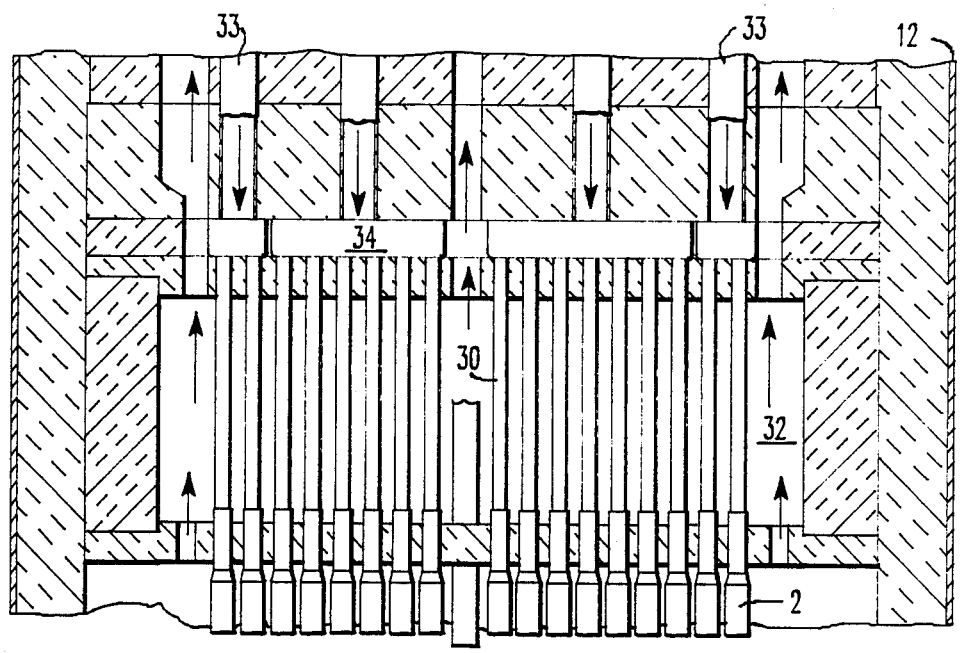
FIG. 4A is a side view in section showing the top portion of a fuel cell generator, similar to that of FIG. 4, and illustrates an alternative for increased heating of the cells at the periphery of the generator, by providing a separate reactant gas supply at a higher temperature and a modified flow rate for these cells.

In FIG. 4A, there is shown another alternative generator configuration for providing additional heat to the cells at the periphery of the generator. In heat exchange manifold 32, all air inlet tubes 30 are of the same length, but separate air manifolds 33 and 34, are provided for distributing air to the tubes 30 at the periphery and at the center of the generator, respectively. The air sent to manifolds 33 can be pre-heated to a higher temperature, and can be sent at a different flow rate, than the air sent to manifolds 34, thereby increasing the temperature of the tubes at the periphery over what it otherwise would have been as a result of insulation heat loss.

Figure 4B:
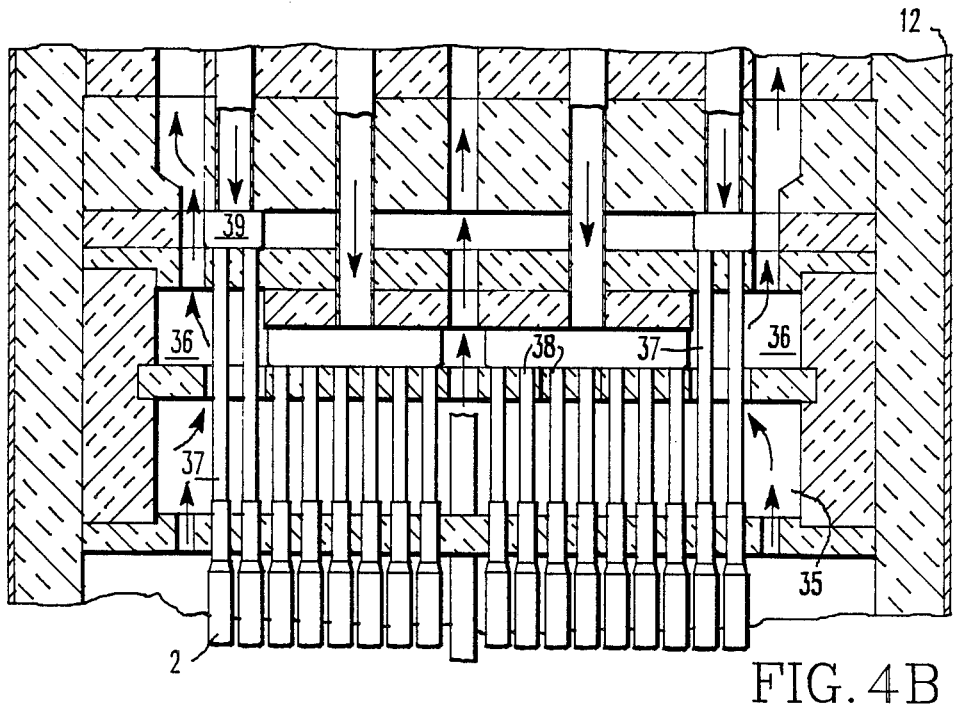
FIG. 4B is also a side view in section showing the top portion of a fuel cell generator similar to that of FIG. 4, and illustrates still another alternative for increasing exhaust gas flow over reactant gas feed tubes for cells at the periphery of the generator.

A third alternative configuration for providing additional heat to the cells at the periphery of the generator is shown in FIG. 4B. In FIG. 4B, the heat exchange manifold 35 is reduced in size and a supplemental heat exchange manifold 36 is provided for the cells at the periphery. The air inlet tubes 37 at the periphery are longer than those at the center 38 and contact the exhaust gases both in heat exchange manifold 35 and in supplemental heat exchange manifold 36. In addition, separate air inlet manifolds 39 and 40 are provided for tubes at the periphery and at the center, respectively, so that the temperature and flow rate of air entering the tubes at the periphery can be independently controlled.

Although solid oxide fuel cells are used in the above escriptions, the configurations have equal applicability for other functions of high-temperature electrolytic cell stacks such as in the electrolytic breakdown of water vapor into its hydrogen and oxygen components.

I claim:

1. In a solid oxide fuel cell generator having a multiplicity of electrically connected solid oxide fuel cells, where a fuel gas is passed over one side of said cells and a gaseous source of oxygen is passed over the other side of said cells, whereby said fuel is consumed and heat and electricity are generated, the improvement which comprises said cells being disposed in the configuration of a spiral.

2. The invention according to claim 1 wherein the flow of said gaseous source of oxygen to those cells that are at the periphery of said generator is separately controlled relative to the flow of said gaseous source of oxygen to those cells that are at the center of said generator.

3. The invention according to claim 2 wherein said flow of said gaseous source of oxygen to those cells that are at the periphery of said generator is greater than the flow of said gaseous source of oxygen to those cells that are at the center of said generator.

4. The invention according to claim 1 wherein the concentration of oxygen in said gaseous source of oxygen that flows to those cells that area at the periphery of said generator is greater than the concentration of oxygen in said gaseous source of oxygen that flows to those cells that are at the center of said generator.

5. The invention according to claim 1 wherein the temperature of said gaseous source of oxygen that flows to those cells that are at the periphery of said generator is greater than the temperature of said gaseous source of oxygen that flows to those cells that are at the center of said generator.

6. The invention according to claim 1 wherein said fuel cells are placed within a metal canister that is a barrier to hydrogen, and insulation is placed outside of said canister.

7. The invention according to claim 6 wherein insulation is alumina.

8. The invention according to claim 1 wherein the electrical connection between said cells is attached to each cell on opposite sides of the cell so that the portions of each cell that are in between said attached electrical connections are equal.

9. The invention according to ciaim 8 wherein said electrical connection is a strip, U-shaped in cross-section, with the open portion of the U facing towards the outside of said generator.

10. The invention according to claim 1 wherein all of said cells are electrically connected in series.

11. In a solid oxide fuel cell generator having a multiplicity of electrically connected solid oxide fuel cells, where a fuel gas is passed over one side of said cells and a gaseous source of oxygen is passed over the other side of said cells, whereby said fuel is consumed and heat and electricity are generated the invention which comprises arranging said cells in a plurality of concentric circles.

12. The invention according to claim 11 wherein the flow of said gaseous source of oxygen to those cells that are at the center of said generator is separately controlled relative to the flow of said gaseous source of oxygen to those cells that are at the periphery of said generator.

13. The invention according to claim 12, wherein said flow of said gaseous source of oxygen to those cells that are at the periphery of said generator is greater than the flow of said gaseous source of oxygen to those cells that are at the center of said generator.

14. The invention according to claim 11 wherein the concentration of oxygen in said gaseous source of oxygen that flows to those cells that area at the periphery of said generator is greater than the concentration of oxygen in said gaseous source of oxygen that flows to those cells that are at the center of said generator.

15. The invention according to claim 11 wherein the temperature of said gaseous source of oxygen that flows to those cells that are at the periphery of said generator is greater than the temperature of said gaseous source of oxygen that flows to those cells that are at the center of said generator.

16. The invention according to claim 11 wherein said fuel cells are placed within a metal canister that is a barrier to hydrogen, and insulation is placed outside of said canister.

17. The invention according to claim 16 wherein said insulation is alumina.

18. The invention according to claim 11 wherein the electrical connection between said cells is attached to each cell on opposite sides of the cell so that the portions of each cell that are in between said attached electrical connections are equal.

19. The invention according to claim 18 wherein said electrical connection in a strip, U-shaped in cross-section, with the open portion of the U facing towards the center of said generator.

20. The invention according to claim 11 wherein all of said cells are electrically connected in series.

21. In a solid oxide fuel cell generator having a multiplicity of electrically connected solid oxide fuel cells, where a fuel gas is passed over one side of said cells and a gaseous source of oxygen is passed over the other side of said cells, whereby heat and electricity are generated, the improvement which comprises arranging said cells in the configuration of folded rows where the outside periphery of said folded rows is circular.

22. The invention according to claim 21 wherein the flow of the source of oxygen to those cells that are at the center of said generator is separately controlled relative to the flow of said source of oxygen to those cells that are at the periphery of said generator.

23. The invention according to claim 22 wherein said flow of said gaseous source of oxygen to those cells that are at the periphery of said generator is greater than the flow of said gaseous source of oxygen to those cells that are at the center of said generator.

24. The invention according to claim 21 wherein the concentration of oxygen in said gaseous source of oxygen that flows to those cells that area at the periphery of said generator is greater than the concentration of oxygen in said gaseous source of oxygen that flows to those cells that are at the center of said generator.

25. The invention according to claim 21 wherein the temperature of said gaseous source of oxygen that flows to those cells that are at the periphery of said generator is greater than the temperature of said gaseous source of oxygen that flows to those cells that are at the center of said generator.

26. The invention according to claim 21 wherein said fuel cells are placed within a metal canister that is a barrier to hydrogen, and insulation is placed outside of said canister.

27. The invention according to claim 26 wherein said insulation is alumina.

28. The invention according to claim 21 wherein the electrical connection between said cells is attached to each cell on opposite sides of the cell so that the portions of each cell that are in between said attached electrical connections are equal.

* * * * *